United States Patent [19]

Ruehle

[11] 4,146,870
[45] Mar. 27, 1979

[54] SEISMIC EXPLORATION FOR DIPPING FORMATIONS

[75] Inventor: William H. Ruehle, Duncanville, Tex.

[73] Assignee: Mobil Oil Corporation, New York, N.Y.

[21] Appl. No.: 793,680

[22] Filed: May 4, 1977

Related U.S. Application Data

[63] Continuation-in-part of Ser. No. 709,486, Jul. 28, 1976, abandoned.

[51] Int. Cl.² .............................................. G01V 1/38
[52] U.S. Cl. .............................. 340/7 R; 340/15.5 CP
[58] Field of Search ........ 340/7 R, 15.5 MC, 15.5 CP

[56] References Cited

U.S. PATENT DOCUMENTS

| | | | |
|---|---|---|---|
| 3,346,068 | 10/1967 | Woods et al. | 340/15.5 CP |
| 3,472,334 | 10/1969 | Snodgrass | 340/15.5 MC |
| 3,539,984 | 11/1970 | Schneider | 340/15.5 CP |
| 3,696,331 | 10/1972 | Guinzy et al. | 340/15.5 CP |
| 3,766,519 | 10/1973 | Stephenson | 340/15.5 CP |
| 3,793,620 | 2/1974 | Miller | 340/15.5 CP |
| 3,858,167 | 12/1974 | Stas et al. | 340/15.5 CP |
| 3,953,826 | 4/1976 | Brundrit | 340/7 R |

Primary Examiner—Howard A. Birmiel
Attorney, Agent, or Firm—C. A. Huggett; George W. Hager, Jr.

[57] ABSTRACT

In seismic exploration, reflected seismic energy is detected by hydrophones to produce seismograms to emphasize a dipping formation which is of interest. The seismograms are produced by directing seismic energy from an array of sources at an angle such that it will reflect vertically from the dipping formation and intersect the hydrophones orthogonally. Directivity of the array is obtained by delaying the seismic pulses produced by each source.

3 Claims, 4 Drawing Figures

SEISMIC EXPLORATION FOR DIPPING FORMATIONS

This application is a continuation-in-part of U.S. patent application Ser. No. 709,486 filed July 28, 1976 now abandoned.

BACKGROUND OF THE INVENTION

This invention relates to seismic exploration and, more particularly, to the production of seismograms having enhanced reflections from a subsurface formation of interest.

A typical seismic source which is used in marine exploration is shown in U.S. Pat. No. 3,506,085 to George B. Loper. Arrays of air guns, such as shown in this patent, can be towed behind the exploration vessel. The vessel also tows an array of hydrophones which detects energy from the sources after reflection from the subsurface formations. The detected reflected energy is recorded as seismograms. A typical field recording system is the Texas Instruments Model DFS IV Digital Field Recorder.

Often, the geophysicist is particularly interested in a dipping subsurface formation. It would be desirable to obtain seismograms with enhanced reflections from this dipping formation.

Related Cases

Copending application Ser. No. 669,077, filed Mar. 22, 1976, by William H. Ruehle, describes a long linear array of marine sources suitable for use in carrying out the seismic exloration of this invention.

Copending application Ser. No. 709,485, filed July 28, 1976, describes and claims the method of marine seismic exploration wherein conventionally fired sources are used to produce seismograms from which the characteristics of the medium through which the seismic energy passed can be measured. These measurements are then converted into control parameters which are applied to an array of sources to produce seismograms having enhanced reflections.

SUMMARY OF THE INVENTION

In accordance with this invention, seismic reflection signals from a dipping formation are enhanced by controlling the directivity of an array of marine seismic sources so that energy from the sources reflects from the dipping formation approximately vertically and intersects an array of hydrophones orthogonally.

A conventional survey is performed to identify the subsurface formation of interest. From the seismic reflection signals produced in this survey, the dip of the formation of interest can be determined. Then, a survey is run in accordance with this invention to produce seismograms having enhanced reflections from that formation.

The firing of each source in the array is delayed so that the resulting seismic wave is directional. That is, the seismic wave does not travel vertically toward the dipping formation, but rather travels at a desired angle. This angle is such that as the seismic energy strikes the dipping formation it is reflected in a vertical direction.

In marine exploration this directivity can alternatively be obtained by changing the length of the cable between each surface bouy and its source. By towing succeeding sources at differing depths, the array of sources produces a seismic wave which travels at the desired angle.

DESCRIPTION OF THE PREFERRED EMBODIMENT

Figure 1:
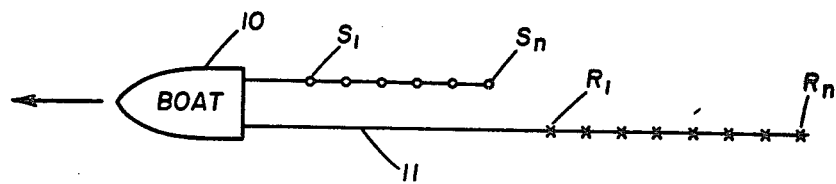
FIGS. 1 and 3 show a marine seismic exploration system for carrying out the invention.

FIG. 1 illustrates a marine seismic exploration system which can be used to carry out the present invention. A vessel 10 traverses a seismic exploration line in surveying the subsurface formation beneath a water layer. A linear horizontal array of seismic sources $S_1-S_n$ is towed behind the vessel 10. Also towed behind the vessel at a greater distance than the sources is a horizontal array of acoustic receivers $R_1-R_n$. As the vessel 10 traverses a desired exploration line, the seismic sources $S_1-S_n$ are fired simultaneously to produce a seismic pressure wave in the water layer. The acoustic receivers $R_1-R_n$ generate electrical signals in response to the reception of seismic reflections from the subsurface formations caused by the generation of the seismic pressure wave. These electrical signals are connected by way of the cable 11 to conventional recording equipment aboard the vessel 10.

Figure 2:
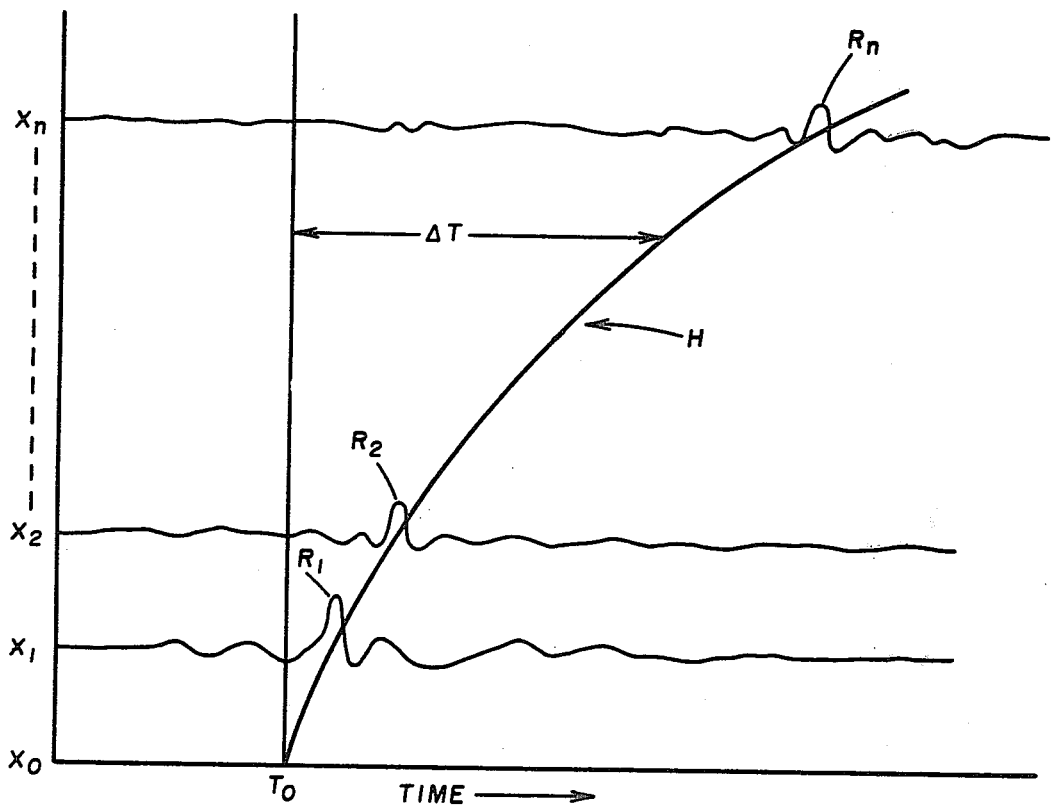
FIG. 2 depicts a conventionally recorded seismogram.

In a typical marine seismic exploration operation, the seismic sources $S_1-S_n$ are fired simultaneously and repetitively as the vessel 10 traverses the exploration line. The seismic reflection signals represented by the recorded signals from the acoustic receivers $R_1-R_n$ for each seismic source firing are conventionally recorded as side-by-side traces on the seismogram of FIG. 2. The arrival times of the reflection signals from receivers $R_1-R_n$ are illustrated as falling along the curve H. This curve is specified by the hyperbolic function:

$$T_x = \sqrt{T_o^2 + X^2/V^2} \tag{1}$$

where, $T_x$ is the time of the reflection on a particular seismic trace;

$T_o$ is the time of that reflection on an idealized seismic trace with a reflection point directly under the shotpoint;

X is the horizontal distance between the shotpoint and the receiver producing the particular seismic trace; and V is the acoustic velocity characteristic of the layer through which the seismic energy travels.

However, when there is a dipping subsurface formation having the angle $\alpha$ between the horizontal and the formation itself, the times $T_X$ of the seismic reflections from such dipping formation are changed by the amount of the dip angle $\alpha$ so that the arrival time curve H becomes:

$$T_X = \sqrt{T_o^2 + \frac{X^2}{V^2} \pm \frac{2XT_o \sin\alpha}{V}} \tag{2}$$

(Positive signs illustrate a receiver array down dip from a source array.)

U.S. Pat. No. 3,696,331 is an example of a process for determining and storing values of the subsurface dip and acoustic velocity in accordance with the expression of Equation (2).

Figure 3:
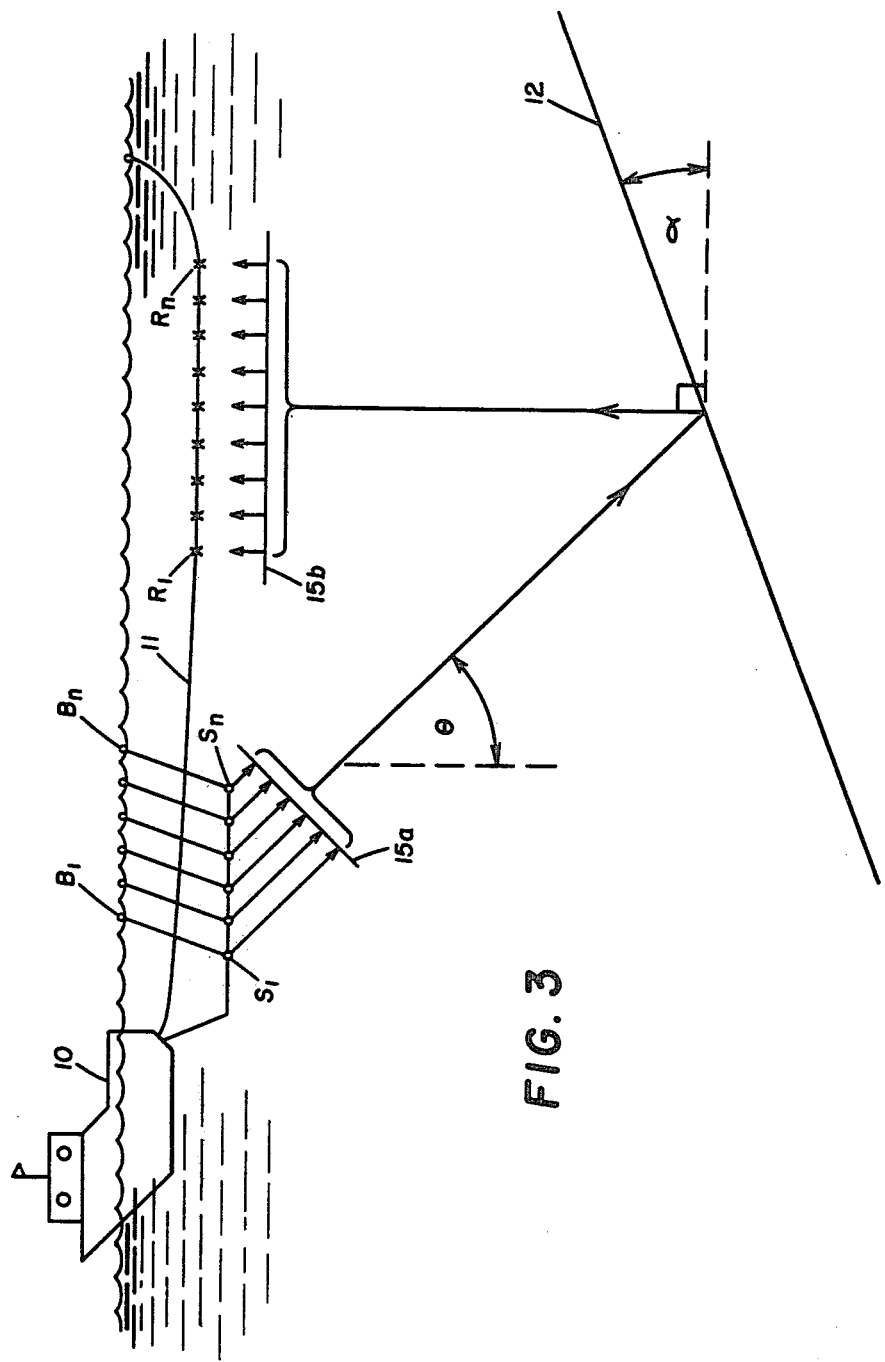

In accordance with the present invention, a second traverse is made by the vessel 10 along the exploration line, and the values of dip and acoustic velocity determined during the first traverse are now used to control the sequential firing of the array of seismic sources so that the resultant seismic pressure wave is directed into the water at a desired angle $\theta$ along the line of exploration. This desired angle $\theta$ is such that the seismic pressure wave as illustrated at 15a in FIG. 3 strikes the dipping formation 12 and is reflected vertically toward the line of seismic receivers $R_1$-$R_n$. Such directivity may be obtained by delaying the time of firing of the successive sources $S_1$-$S_n$, the time delay being given by the expression:

$$\tau = \frac{\Delta X}{V_w} \sin \theta \quad (3)$$

where, $\Delta X$ is the spacing between sources, $V_w$ is the velocity of the seismic energy in water, and $\theta$ is the directivity angle.

It is the specific aspect of this invention that the directivity angle $\theta$ be such that the reflected seismic pressure wave from the dipping formation 12 travel vertically toward the water surface. In this manner, the reflected seismic pressure wave, illustrated at 15b in FIG. 3, will strike the horizontal array of receivers $R_1$-$R_n$ orthogonally, thereby permitting the production of seismograms having enhanced reflections from the dipping formation.

As can be noted from the expression of Equation (2), the moveout of the recorded reflection signals from the array of receivers $R_1$-$R_n$ is related to twice the Sin of the dip angle $\alpha$. Accordingly, applicant delays the firings of the successive seismic sources $S_1$-$S_n$ so that the directivity angle $\theta$ for the downwardly traveling seismic pressure wave deviates from the vertical by twice the amount of the dip angle $\alpha$ of the formation 12. The timing sequence of the firings of the seismic sources to generate each seismic pressure wave may be continually changed during the second traverse along the line of exploration in accordance with the determined values of dip and velocity from the first traverse along the line of exploration.

In the alternative, the foregoing-described marine seismic exploration operation may be carried out during a single traverse along the line of exploration by alternating the firings of the seismic sources between a first simultaneous firing of all the sources and a second sequential firing of all the sources. Following the first simultaneous firing, the value of dip and velocity is determined as described above and a second sequential firing of all the sources is then carried out so as to direct the resultant seismic pressure wave at the angle $\theta$ which is twice the amount of the angle of dip $\alpha$ determined from the first simultaneous firing of all the seismic sources. This sequence of first and second firings is repeated along the entire line of exploration. Suitable firing circuits are used to fire the sources in a time sequence with the time delay $\tau$ between each source. One example of such a firing circuit is shown in U.S. Pat. No. 3,687,218 — Ritter.

Figure 4:
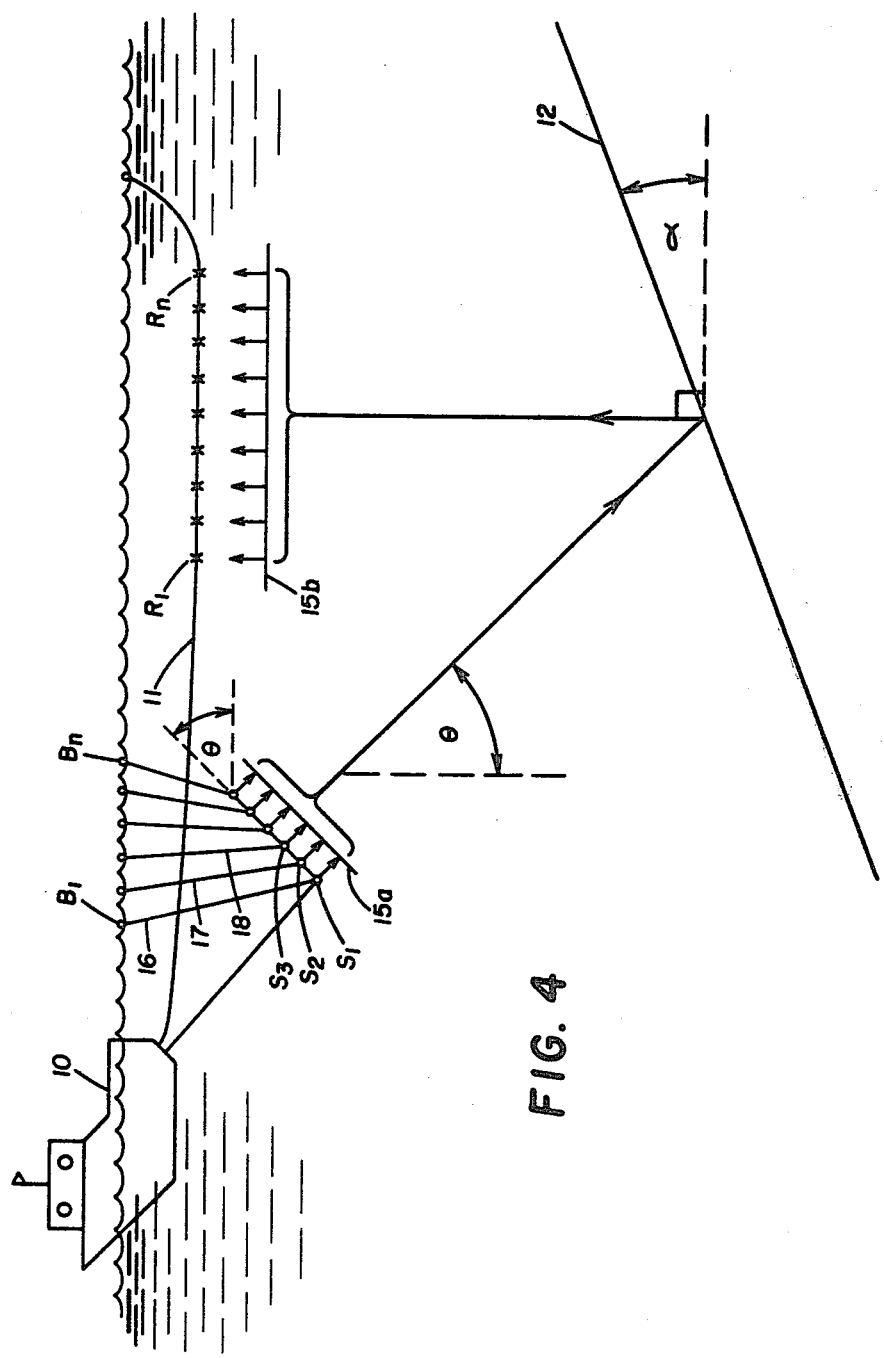
FIG. 4 shows an alternative embodiment in which the seismic source array is tilted.

An alternative way of obtaining a directive array of sources is shown in FIG. 4. The linear array of sources is towed at an angle $\theta$ from the horizontal so that the seismic wave produced by a simultaneous firing of the sources has the directivity angle $\theta$ with respect to the vertical. This is achieved by successively changing the length of the cables between the surface buoys and the sources. That is, the cable 16 is longer than the cable 17 and the cable 17 is longer than the cable 18 so that source $S_1$ is deeper than source $S_2$ and source $S_2$ is deeper than source $S_3$ and so on.

While a particular embodiment of the invention has been shown and described with respect to marine seismic exploration, other modifications, including land seismic exploration, which are within the true spirit and scope of the invention are intended to be covered by the appended claims.

I claim:

1. A method of marine seismic exploration comprising:
    (a) towing at least one seismic source along a line of exploration,
    (b) repeatedly firing said source at spaced points along said line of exploration,
    (c) recording seismic signals reflected from subsurface formations along said line of exploration,
    (d) determining from said seismic reflection signals the dips of said subsurface formations,
    (e) towing a linear array of sources along a line of exploration that follows the downward-dip direction of said subsurface formations,
    (f) repeatedly firing said seismic sources at spaced points along said line of exploration to produce at each of said spaced points a seismic pressure wave that travels through the water in an upward-dip direction with respect to the vertical that is twice the angle of the dip determined for the particular subsurface formation at said spaced points along said line of exploration, whereby each of said seismic waves reflects from the subsurface formation and travels vertically toward the water surface, and
    (g) detecting each of said reflected seismic waves.

2. The method recited in claim 1 wherein the step of firing said linear array of seismic sources comprises delaying the seismic pulses produced by each source in said array by a time delay between said sources to direct seismic energy at said angle.

3. The method of claim 1 wherein the step of firing said linear array of seismic sources comprises:
    (a) towing said linear array of sources at said angle from the horizontal, and
    (b) firing the sources in said array simultaneously.

* * * * *